(12) United States Patent
Niebur

(10) Patent No.: US 11,498,173 B2
(45) Date of Patent: Nov. 15, 2022

(54) WOOD-PROCESSING SYSTEM AND WOOD-PROCESSING METHOD

(71) Applicant: IMA Schelling Deutschland GmbH, Lübbecke (DE)

(72) Inventor: Dirk Niebur, Hüllhorst (DE)

(73) Assignee: IMA Schelling Deutschland GmbH, Lübbecke (DE)

( * ) Notice: Subject to any disclaimer, the term of this patent is extended or adjusted under 35 U.S.C. 154(b) by 0 days.

(21) Appl. No.: 17/393,470

(22) Filed: Aug. 4, 2021

(65) Prior Publication Data

US 2021/0379716 A1    Dec. 9, 2021

Related U.S. Application Data

(63) Continuation-in-part of application No. 16/629,451, filed as application No. PCT/EP2018/069975 on Jul. 24, 2018, now abandoned.

(30) Foreign Application Priority Data

Jul. 25, 2017  (DE) .................. 102017116838.9

(51) Int. Cl.
  *B23Q 7/04*  (2006.01)
  *B23Q 7/10*  (2006.01)
  *B27M 1/08*  (2006.01)

(52) U.S. Cl.
  CPC ............. *B23Q 7/046* (2013.01); *B23Q 7/103* (2013.01); *B27M 1/08* (2013.01)

(58) Field of Classification Search
  CPC .......... B23Q 7/046; B23Q 7/103; B27M 1/08; B65G 59/02; B65G 57/02; B65G 61/00; B65G 37/02; B65G 47/52; B65G 37/00; B65G 57/04; B65G 47/91; B65G 57/03;
  (Continued)

(56) References Cited

U.S. PATENT DOCUMENTS 4,969,109 A * 11/1990 Mizuno .............. G05B 19/237
                                                            901/50
5,088,533 A    2/1992 Binder
(Continued)

FOREIGN PATENT DOCUMENTS

DE     10016693 A1    10/2001
DE     10016693 B4    10/2001
(Continued)

OTHER PUBLICATIONS

WIPO, International Search Report in PCT/EP2018/069975.

*Primary Examiner* — Gregory W Adams
(74) *Attorney, Agent, or Firm* — Laurence P. Colton; Smith Tempel Blaha LLC

(57) ABSTRACT

A wood-processing system having a buffer, which receives and buffers planar workpieces of wood materials or wood substitute materials, and a deposit device, onto which workpieces removed from the buffer can be deposited. At least one robot is included to remove the workpieces from the buffer and to deposit said workpieces on a deposit element of the deposit device and/or at another deposit location in the buffer. The system can be operated continuously, with workpieces being loaded sequentially into the buffer, removed from the buffer by the robot, and sorted onto the deposit device.

18 Claims, 12 Drawing Sheets

(58) Field of Classification Search
CPC ... B65G 59/04; B65G 57/005; Y10S 414/106; Y10S 414/108; Y10S 414/107
See application file for complete search history.

(56) References Cited

U.S. PATENT DOCUMENTS

| | | | |
|---|---|---|---|
| 5,105,606 A * | 4/1992 | Creed | B65B 35/38 |
| | | | 53/499 |
| 5,336,042 A | 8/1994 | Winski | |
| 5,908,283 A | 6/1999 | Huang | |
| 6,817,829 B2 | 11/2004 | Kameda | |
| 6,934,605 B1 * | 8/2005 | Dothan | G05B 19/41815 |
| | | | 29/784 |
| 7,266,422 B1 | 9/2007 | DeMotta | |
| 7,993,095 B2 | 8/2011 | Reichler | |
| 8,087,869 B1 | 1/2012 | Binford | |
| 8,931,999 B2 | 1/2015 | Dorner | |
| 2004/0240981 A1 | 12/2004 | Dothan | |
| 2005/0075752 A1 * | 4/2005 | Ban | G05B 19/4182 |
| | | | 700/213 |
| 2012/0323357 A1 * | 12/2012 | Izumi | B25J 9/1697 |
| | | | 901/30 |
| 2016/0207072 A1 | 7/2016 | Hellenbrand | |

FOREIGN PATENT DOCUMENTS

| | | |
|---|---|---|
| DE | 10223858 A1 | 10/2003 |
| DE | 202007015954 U1 | 2/2009 |
| DE | 202016101742 U1 | 7/2017 |
| JP | 62074832 A | 4/1987 |
| WO | 2010151657 A1 | 12/2010 |

* cited by examiner

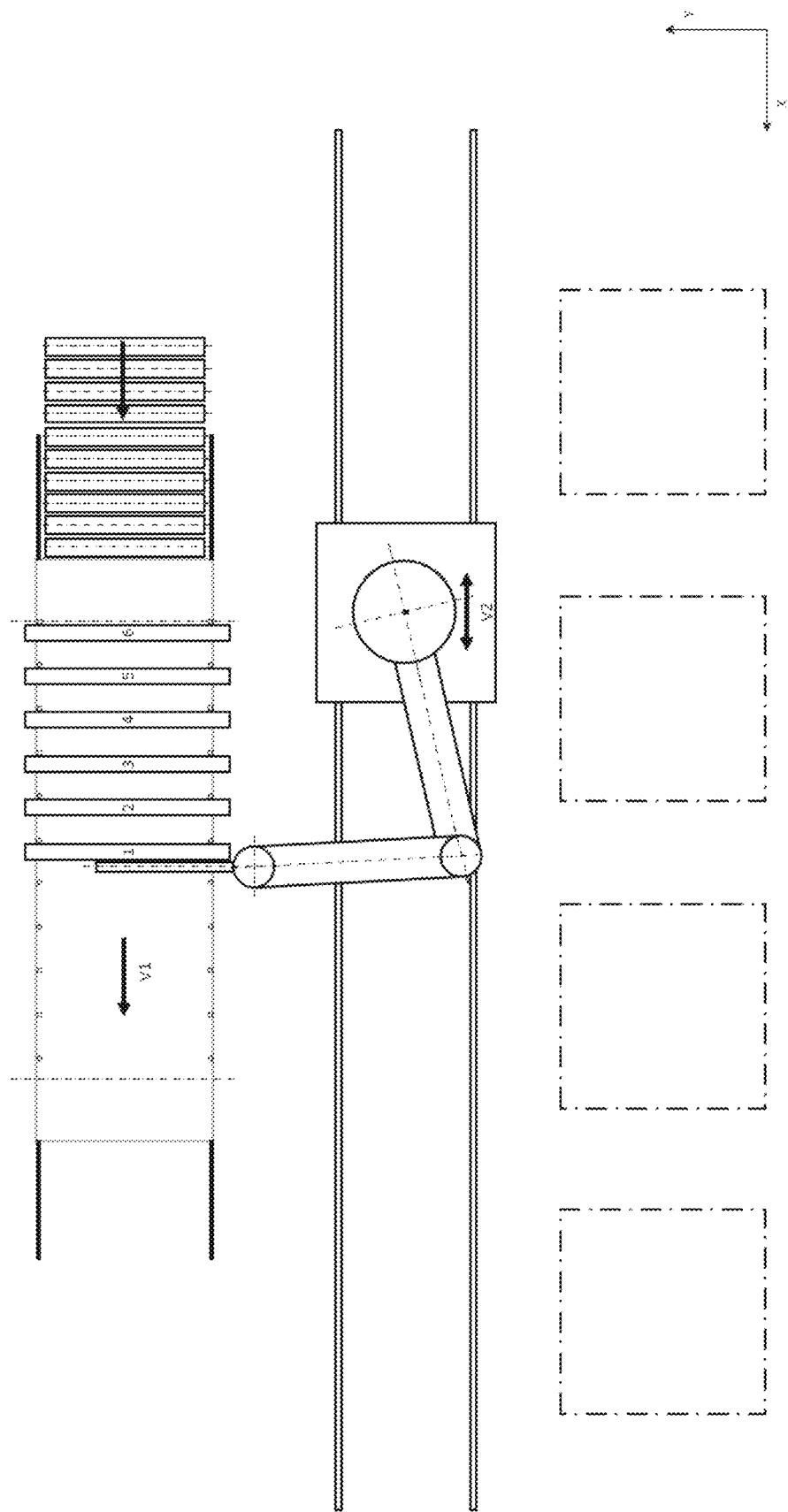

WOOD-PROCESSING SYSTEM AND WOOD-PROCESSING METHOD

CROSS REFERENCE TO RELATED APPLICATIONS

This patent application claims priority on and the benefit of U.S. patent application Ser. No. 16/629,451 having a filing date of 8 Jan. 2020, which is the US National Phase of and claims priority on and the benefit of International Application No. PCT/EP2018/069975 having an international filing date of 24 Jul. 2018, which claims priority on and the benefit of German Patent Application No. 10 2017 116 838.9 having a filing date of 25 Jul. 2017.

BACKGROUND OF THE INVENTION

Technical Field

The invention relates to a wood-processing system and to a wood-processing method that can be carried out using a wood-processing system of this type.

Prior Art

In wood-processing methods in which planar workpieces made of wood or wood-substitute materials are processed, the workpieces pass through a whole range of processing steps in the process. In this process, it is particularly important for workpieces that are undergoing processing to be fed to a buffer where necessary and to be buffered there until they are either fed to another processing step or, alternatively, to picking or quality control. For picking or quality control, the workpieces must be removed from the buffer and deposited according to predetermined sorting or a predetermined order. Depending on the size of the workpieces, very high personnel costs are incurred thereby.

BRIEF SUMMARY OF THE INVENTION

The problem addressed by the present invention is to provide a wood-processing system and a wood-processing method by means of which the personnel costs can be reduced.

This problem is solved by a wood-processing system comprising a buffer that receives and buffers planar workpieces made of wood or wood-substitute materials, a depositing device on which workpieces removed from the buffer can be deposited, and at least one robot that is configured to remove the workpieces from the buffer and to deposit the workpieces on a deposit means of the depositing device and/or at another deposit point in the buffer, and by a wood-processing method in which planar workpieces made of wood or wood-substitute material are guided and/or processed in a wood-processing system, wherein workpieces are fed to a buffer and are buffered therein, wherein buffered workpieces are further removed from the buffer by a robot in accordance with control criteria and are deposited in a predetermined deposit position in a depositing device that is separate from the buffer or in another deposit position in the buffer itself. Advantageous embodiments are found in the dependent claims.

The wood-processing system according to the invention comprises a buffer that receives and buffers planar workpieces made of wood or wood-substitute materials. Furthermore, the wood-processing system has a depositing device on which workpieces removed from the buffer can be deposited. According to the invention, at least one robot is also provided and is configured to remove the workpieces from the buffer and deposit said workpieces on a deposit means of the depositing device and/or at another deposit point in the buffer.

The use of at least one robot provides a whole range of advantages.

First of all, the workpieces removed from the buffer can be deposited in an accurate position in a significantly shorter time than is possible manually. It is also possible to re-sort the workpieces in the buffer, even if the buffer is designed to be movable, for example. By means of the robot, workpieces can be removed from the buffer at any time and fed to quality assurance or picking, for example. Workpieces can also be returned to the buffer. In addition, the use of the robot provides greater flexibility in terms of the design of the buffer and the orientation of the workpieces in the buffer and/or on the deposit means. By using a robot, unlike for simple discharge, the workpieces can be oriented in any manner on the deposit means, for example horizontally, vertically, or obliquely. Likewise, the workpieces can be oriented in any manner in the buffer, as the robot is capable of cooperating both with moving and idle buffers and of removing workpieces from the buffers or inserting the workpieces into the buffers.

The buffer is preferably supplied from an ongoing process. For this purpose, the wood-processing system may for example comprise a processing center and/or a processing circuit and/or a sawing device and/or a through-feed processing machine, from which workpieces enter the buffer. For this purpose, it may in particular be provided that the wood-processing system according to the invention comprises a feed device that feeds workpieces to the buffer. The feed may be sequential, but a plurality of workpieces may also be fed to the buffer simultaneously.

In addition, different deposit means may also be provided in the depositing device depending on the intended application. In particular, according to an advantageous embodiment of the present invention, the depositing device may comprise stationary deposit means, in particular pallets and/or a shelf and/or movable deposit means, in particular belt conveyors and/or roller conveyors and/or brush carriages.

Particularly with respect to the picking of finished workpieces, the robot can also be used to apply protective material to individual workpieces. For this purpose, it may in particular be provided that the wood-processing system according to the invention comprises a storage means that can be reached by the robot and stores protective material, in particular protective paper, protective cardboard or protective film.

The radius of action of the robot can be enlarged by the robot itself being movable at least along one axis. In this case, it may in particular be provided that the robot can be moved linearly, in particular in parallel with the depositing device, at least in a first direction, in particular on rails, in order to travel to deposit means arranged in succession in the first direction. In this way, the flexibility of the wood-processing system according to the invention is significantly increased. A second robot can also be provided, which preferably is likewise movable along the same axis as the first robot. This can increase the cycle times, with the two robots also being able to perform different tasks.

According to another embodiment of the present invention, it may be provided that the workpieces can be moved in the buffer.

In terms of the method, the use of at least one robot provides a range of possibilities. According to a wood-processing method according to the invention in which planar workpieces made of wood or wood-substitute materials are guided and/or processing in a wood-processing system, workpieces are fed to the buffer and buffered therein. The buffered workpieces are further removed from the buffer by a robot in accordance with control criteria and are deposited in a predetermined deposit position in a depositing device that is separate from the buffer. Alternatively or additionally, the workpieces can also be deposited in another deposit position in the buffer itself instead of being deposited on the separate depositing device. On one hand, therefore, workpieces can be deposited for discharge, picking or quality assurance, and on the other hand it is possible to re-sort the buffer, i.e., to change the order of the workpieces in the buffer.

According to a preferred variant, the robot, after depositing a workpiece on a deposit means, receives a protective material, in particular protective paper, protective cardboard or protective film, from a storage means and then applies it to said deposited workpiece.

It may also preferably be provided that the robot is moved linearly along the depositing device in a first direction. In this way, it is possible to load the deposit means of a moving or stationary depositing device in succession.

BRIEF DESCRIPTION OF THE DRAWING

The invention will be explained in greater detail in the following with reference to the drawings.

FIG. 6 is a schematic top view of the wood-processing system of FIG. 1 illustrating the removal of a workpiece from the buffer by a robot.

DETAILED DESCRIPTION OF PREFERRED EMBODIMENTS

Figure 1:
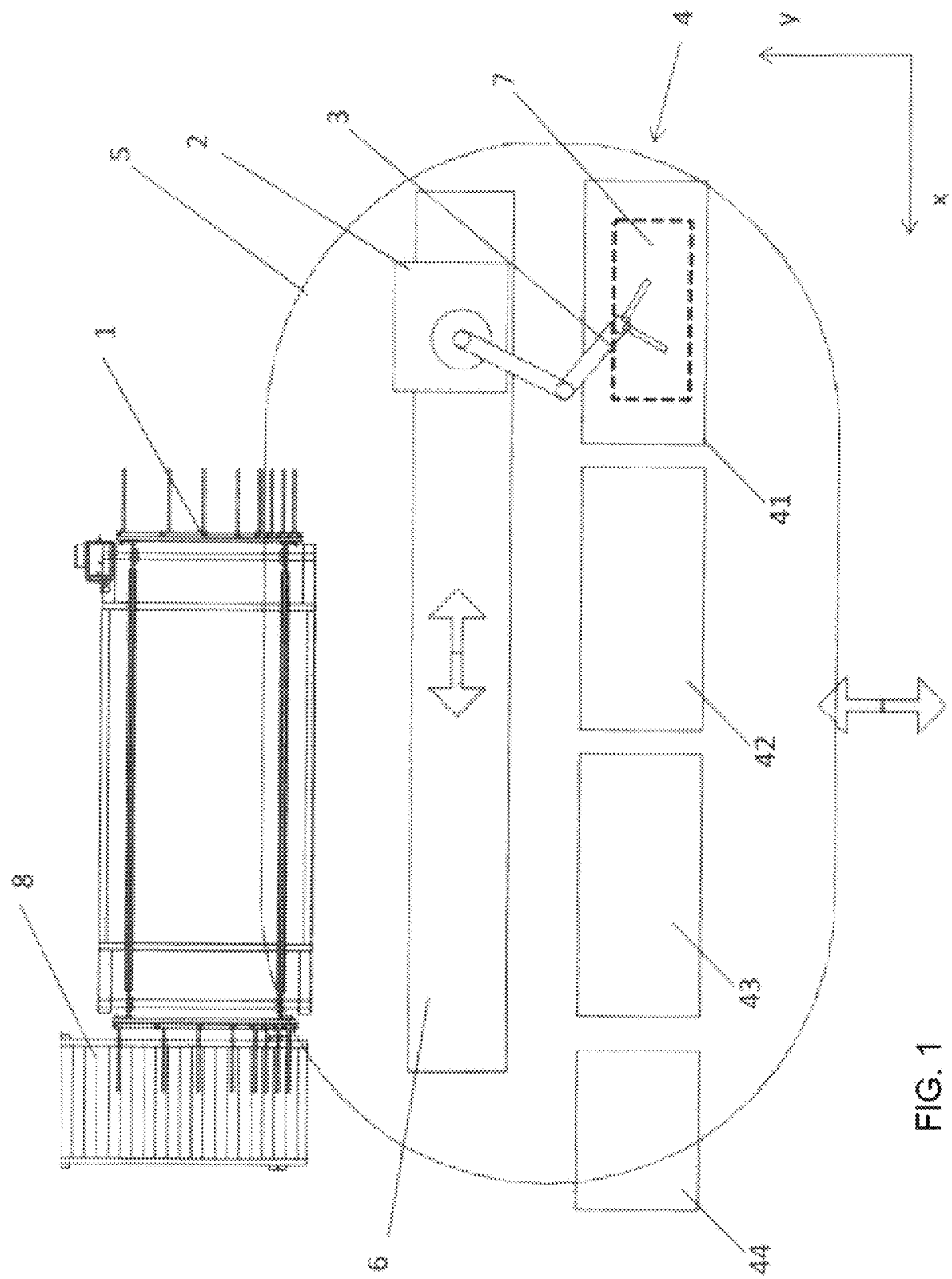
FIG. 1 is a schematic plan view of at least part of a wood-processing system according to the invention.

FIG. 1 shows a buffer 1 in which workpieces 7 are buffered that enter the buffer 1 by means of a feed apparatus 8. The buffer 1 may be designed such that the buffer 1 retains the workpieces 7 in a horizontal manner. Alternatively, it is equally possible to use the feed apparatus 8 to load a buffer 1, which retains the workpieces 7 in a vertical orientation (i.e., perpendicular to the floor).

A depositing device 4 is arranged opposite the buffer 1 and, in the example shown, comprises a plurality of deposit means 41, 42, 43, 44 on which workpieces 7 can be deposited. As indicated in the example shown, the depositing device 4 may be a stationary apparatus. It is equally possible to use a conveying apparatus as a depositing device, for example, which, e.g., conveys the workpieces 7 in the direction X and/or Y or also in a circle. According to the invention, the robot 2 is arranged between the buffer 1 and the depositing device 4, and said robot has a robot arm 3 by means of which a workpiece 7 can be gripped. In the example shown, the robot 2 is mounted on a guide apparatus 6, which may be a rail, for example. The robot 2 is movable on the guide apparatus 6 in the direction X in parallel with the depositing device 4. In this way, the robot 2 can travel to the deposit means 41 to 44 of the depositing device 4 and workpieces 7 can be deposited thereon and/or removed from said deposit means 41 to 44. The range of action of the robot 2 is indicated by the line 5. The robot 2 is therefore capable of traveling to any point within the line 5.

The workpieces 7, which enter the buffer 1 by means of the feed apparatus 8, are removed from the buffer 1 by means of the robot 2 and are either deposited again at another point in the buffer 1 or are transported by the robot 2 to a deposit means 41 to 44 of the depositing device 4 and are deposited there. Likewise, workpieces 7 that are deposited on one of the deposit means 41 to 44 can be removed by the robot 2 and, for example, brought back into the buffer 1. It is also possible for the robot 2 to remove a protective material from a protective material from a protective-material store (not shown) and apply it to a workpiece 7 positioned on the deposit means 41 to 44.

In a preferred embodiment, the buffer 1 can be a moving buffer 1, which is a buffer 1 in which the workpieces 7 entering the buffer 1 are being held in motion. The hedgehog shape of buffer 1 shown in the figures is one example of how this can be accomplished. Further, the robot 2 that is picking up the workpieces 7 from the buffer 1 (or is able to put workpieces 7 into the buffer 1) is capable of being synchronized in its motion with the movement of the workpieces 7 inside the buffer 1.

Figure 2:
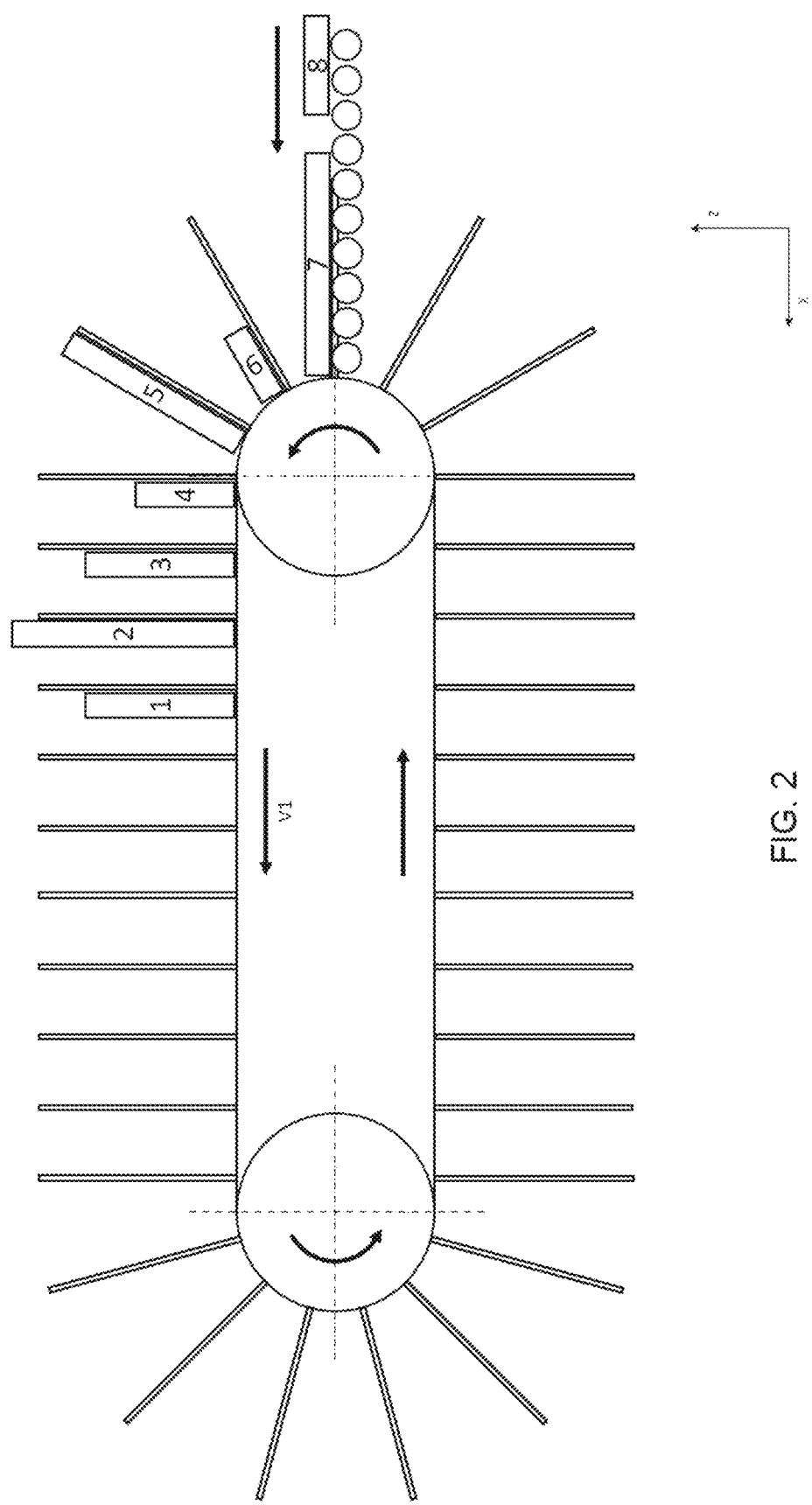
FIG. 2 is a schematic side view of a buffer of the wood-processing system of FIG. 1 in a first successive operating position illustrating the loading of workpieces into the buffer.
Figure 3:
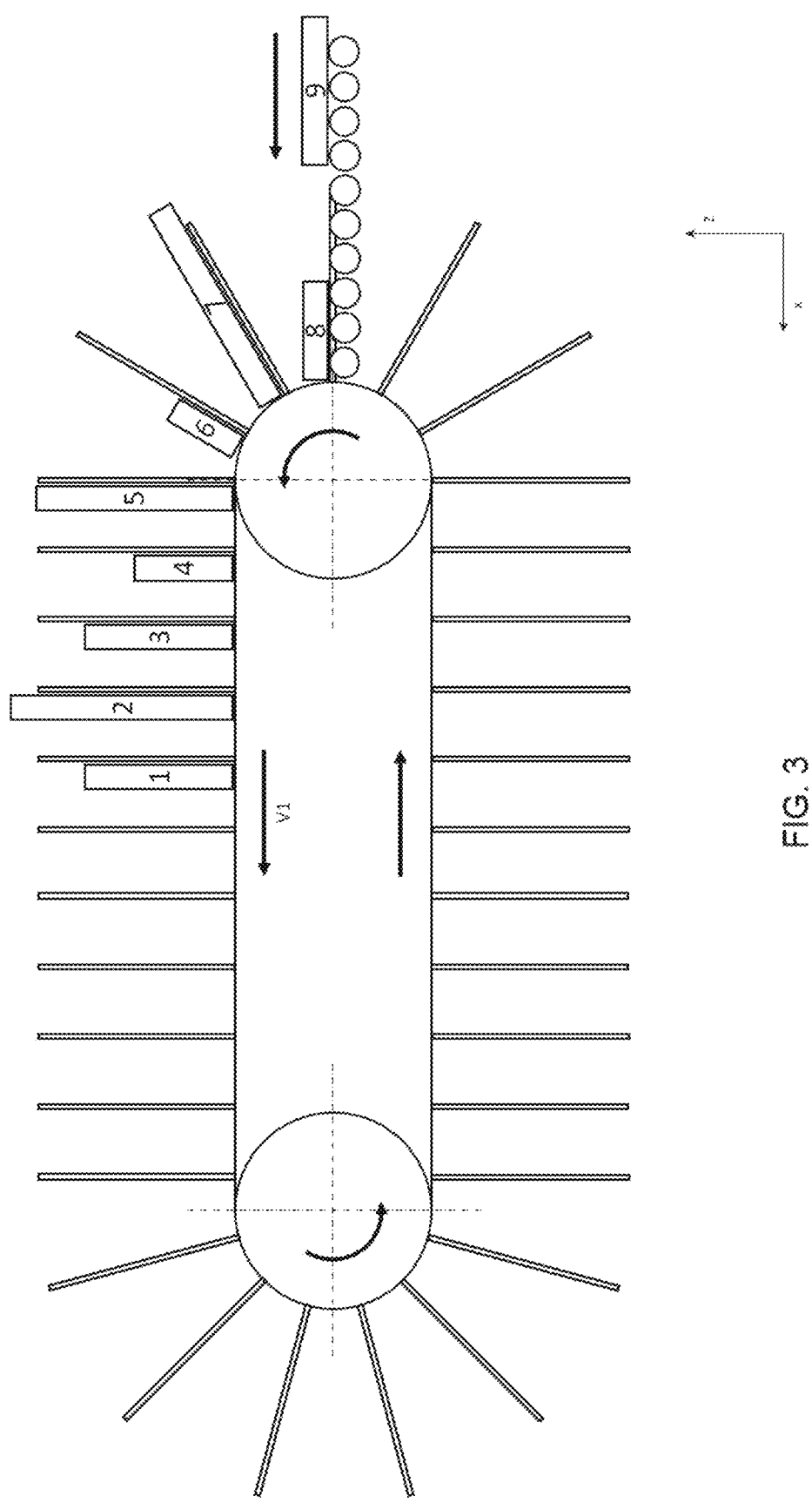
FIG. 3 is a schematic side view of the buffer of the wood-processing system of FIG. 1 in a second successive operating position illustrating the loading of workpieces into the buffer.
Figure 4:
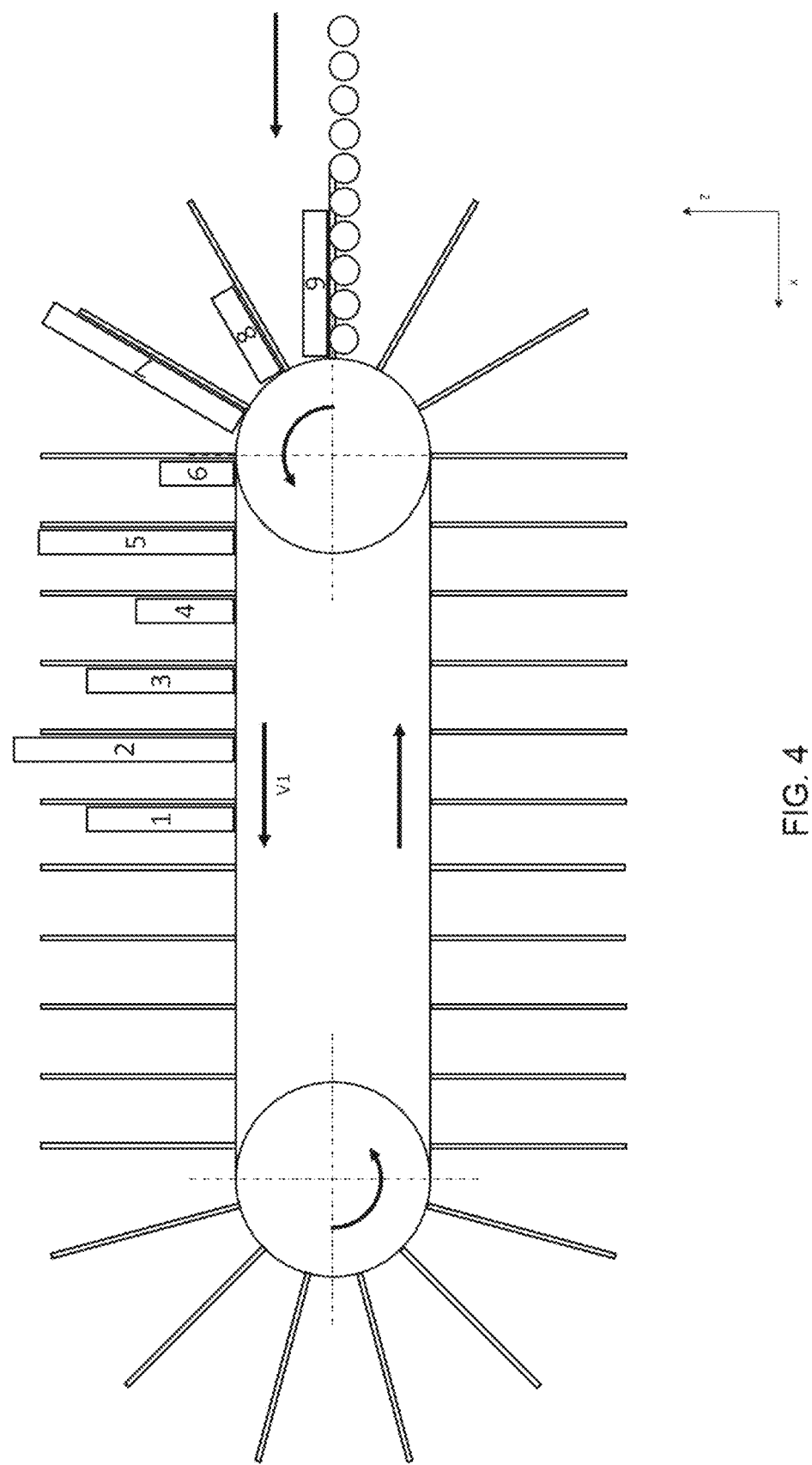
FIG. 4 is a schematic side view of the buffer of the wood-processing system of FIG. 1 in a third successive operating position illustrating the loading of workpieces into the buffer.

Referring to FIGS. 2-5, an exemplary embodiment of a buffer 1 suitable for use in the present invention is illustrated. FIG. 2 is a schematic side view of buffer 1 in a first successive operating position illustrating the loading of workpieces 7 into buffer 1. FIG. 3 is a schematic side view of buffer 1 in a second successive operating position illustrating the loading of workpieces 7 into buffer 1. FIG. 4 is a schematic side view of buffer 1 in a third successive operating position illustrating the loading of workpieces 7 into buffer 1. FIG. 5A is another schematic side view of buffer 1 in the third successive operating position illustrating the loading of workpieces 7 into buffer 1. FIG. 5B is a schematic top view of buffer 1 in the third successive operating position illustrating the loading of workpieces 7 into buffer 1.

As shown in FIGS. 2-4, buffer 1 receives planar workpieces 7 made of wood or wood-substitute materials from a conveying device 11, which can provide workpieces 7 individually or in a successive manner. Buffer 1 comprises a plurality of fingers 12 arranged in rows that can rotate endlessly in a racetrack pattern for buffering and keeping separate workpieces 7 in buffer 1. Fingers 12 rotate through openings 13 in conveying device 11 (see FIGS. 8-12) so as to remove workpieces 7 from conveying device 11 and onto buffer 1. Fingers 12 also act as separating members that keep workpieces 7 separate from each other while in buffer 1. Buffer 7 rotates in the direction shown by arrow V1, and generally in the manner shown by the arrows. Conveying device 11 transports workpieces 7 in the direction shown by the arrow immediately above the workpieces 7 shown resting on conveying device 11, namely, in a direction towards buffer 1.

FIG. 2 illustrates a number of workpieces 7 already in buffer 1 (workpieces 7 labeled 1-7) and two workpieces 7 on conveying device 11 (workpieces 7 labeled 8-9), with one workpiece 7 (workpiece 7 labeled 7) about to be removed from conveying device 11 by fingers 12 on buffer 1, and a first successive workpiece 7 (workpiece 7 labeled 8) being conveyed by conveying device 11. FIG. 3 illustrates the first successive workpiece 7 (workpiece 7 labeled 8) about to be removed from conveying device 11 by fingers 12 on buffer 1, and a second successive workpiece 7 (workpiece 7 labeled 9) being conveyed by conveying device 11. FIG. 4 illustrates the second successive workpiece 7 (workpiece 7 labeled 9) about to be removed from conveying device 11 by fingers 12 on buffer 1.

Figure 5A:
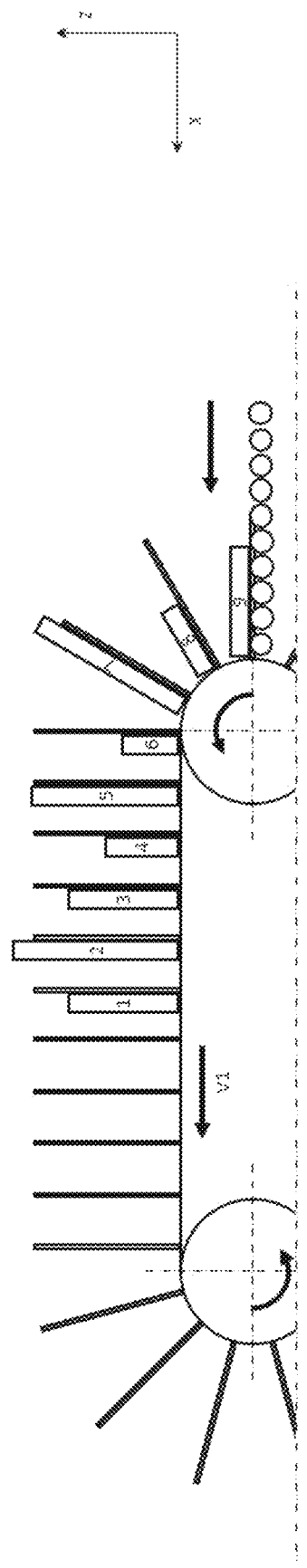
FIG. 5A is another schematic side view of the buffer of the wood-processing system of FIG. 1 in the third successive operating position illustrating the loading of workpieces into the buffer.
Figure 5B:
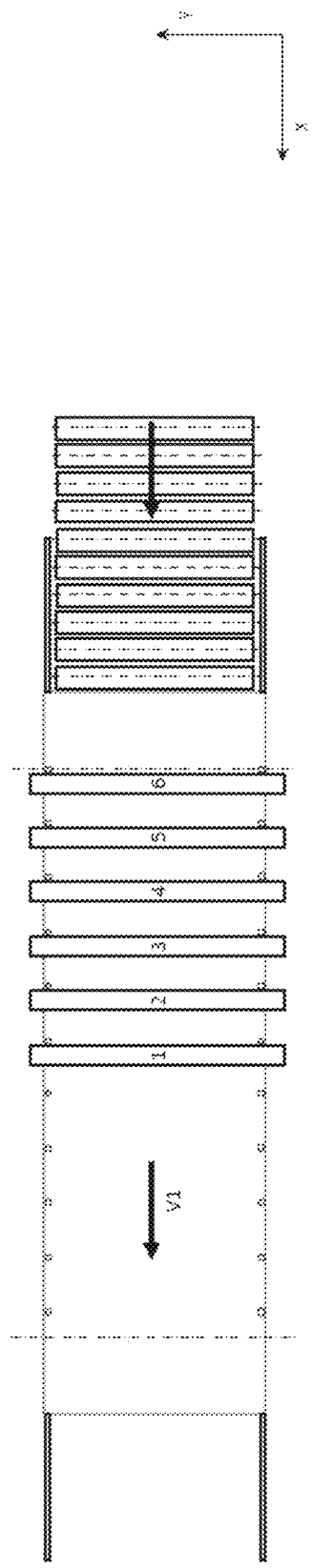
FIG. 5B is a schematic top view of the wood-processing system of FIG. 5A in the third successive operating position illustrating the loading of workpieces into the buffer.

FIGS. 5A and 5B illustrate a side and top schematic view of buffer 1 in the position of the buffer 1 in FIG. 4 for additional detail of the movement of workpieces 7 on conveying device 11, the loading of workpieces 7 onto buffer 1, and the movement of workpieces 7 on buffer 1. Buffer 1 and conveying device 11 preferably are synchronized to the extent that fingers 12 rotate through conveying device 11 at an appropriate time for removing workpieces 7 from conveying device 11 and loading workpieces 7 onto buffer 1.

Figure 7:
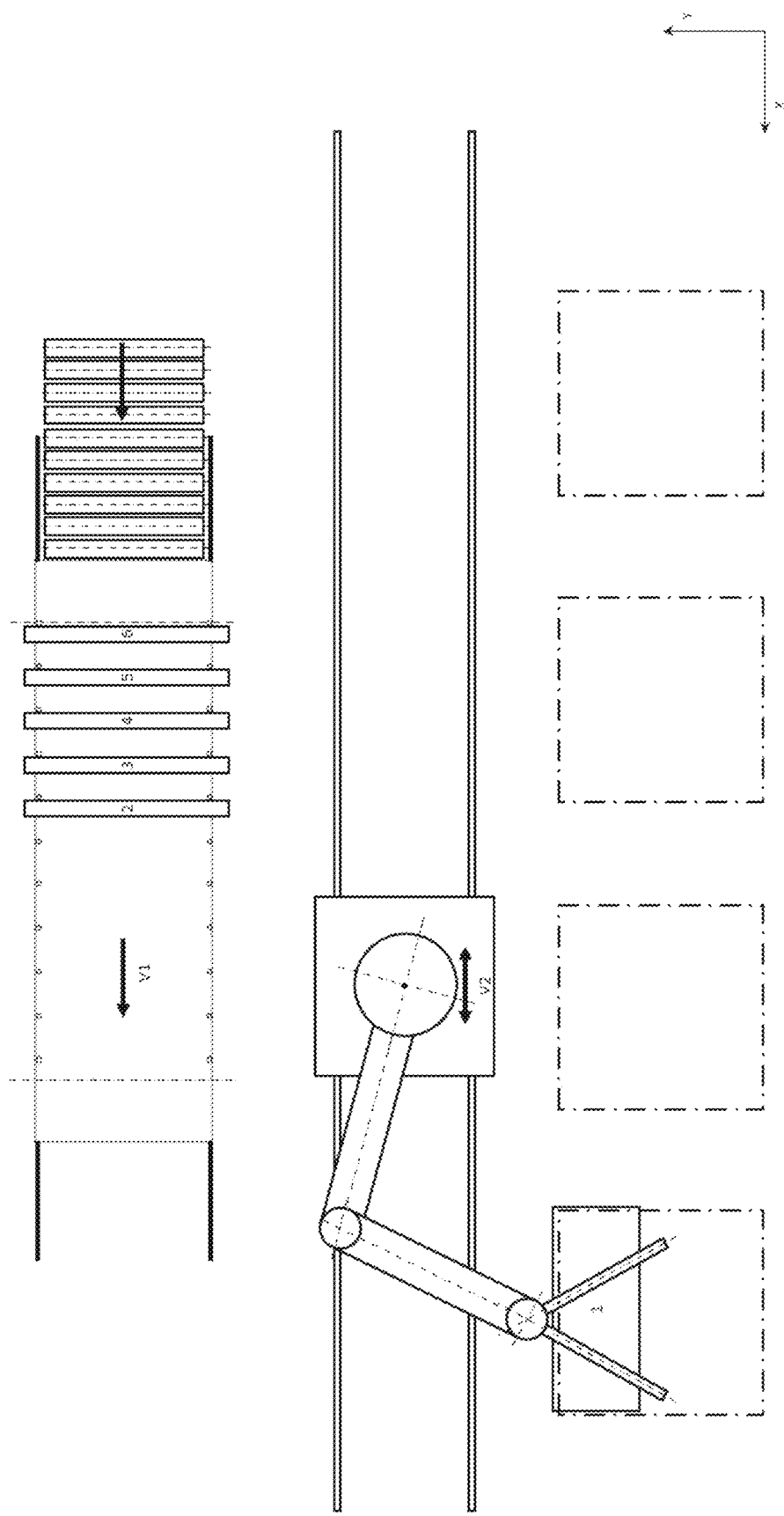
FIG. 7 is a schematic top view of the wood-processing system of FIG. 1 illustrating the placement of a workpiece onto a depositing device by a robot.
Figure 8:
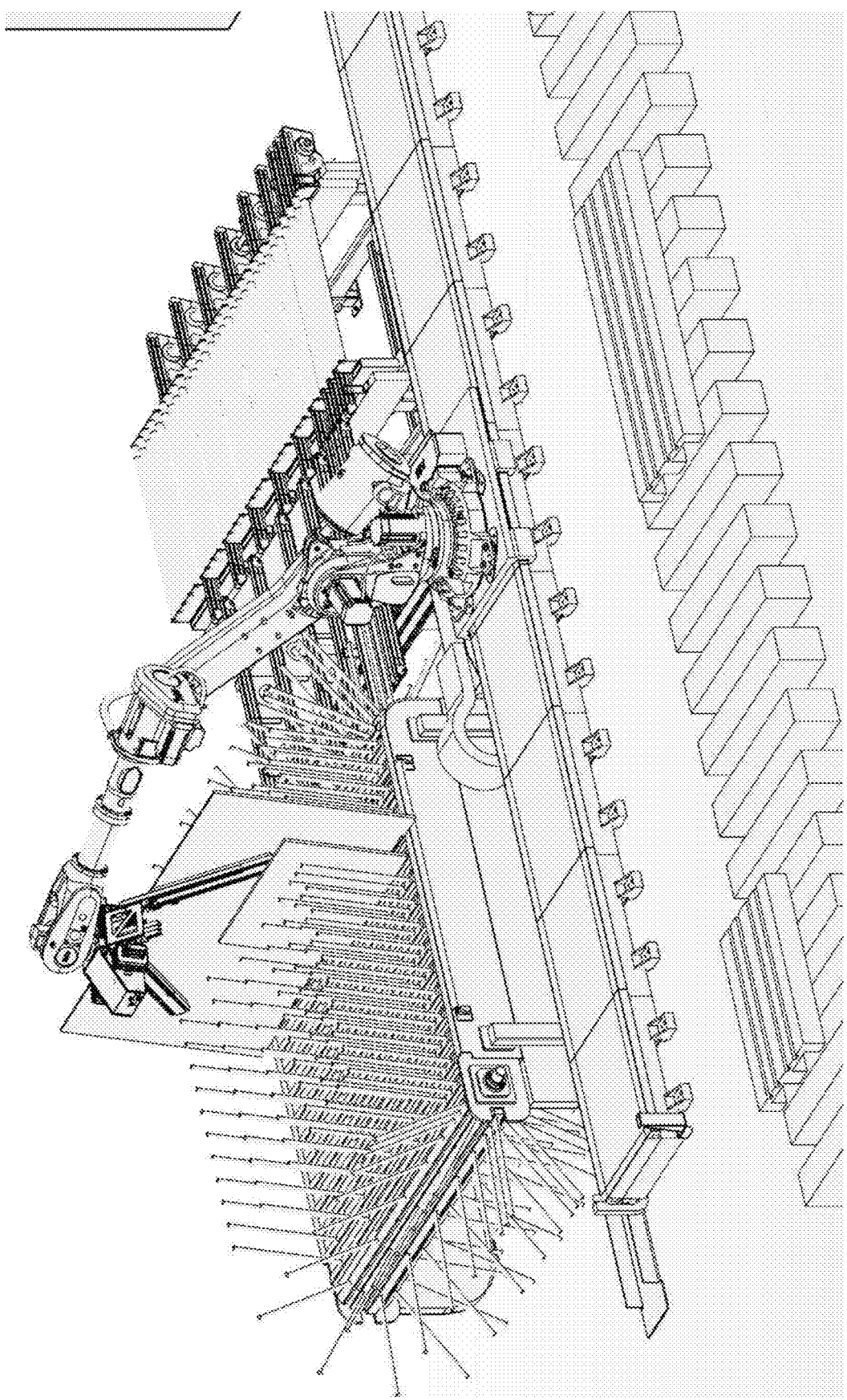
FIG. 8 is a perspective view of the wood-processing system of FIG. 1 illustrating the removal of a first workpiece from the buffer by a robot.
Figure 9:
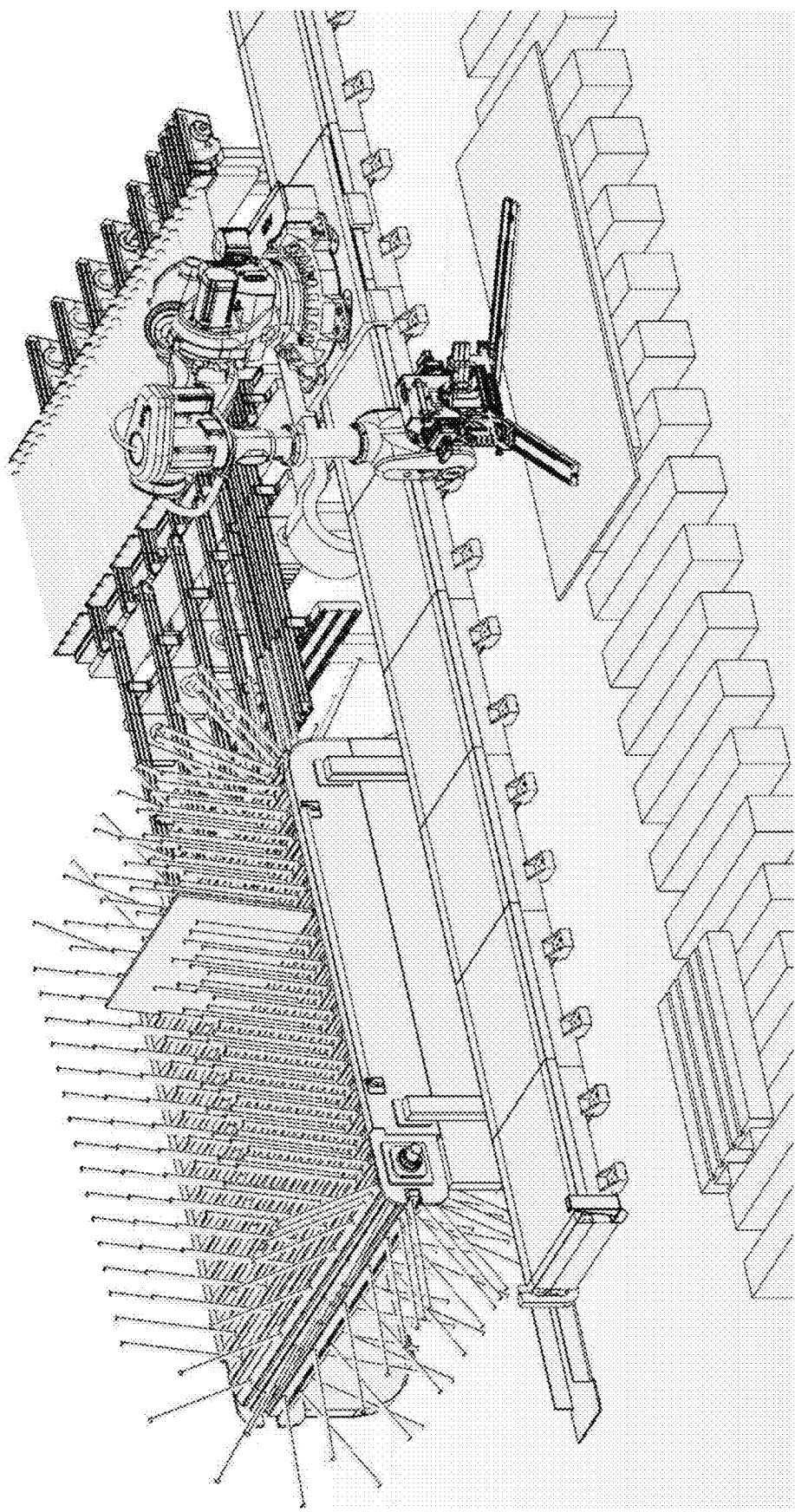
FIG. 9 is a perspective view of the wood-processing system of FIG. 8 illustrating the placement of the first workpiece onto a depositing device by the robot.
Figure 10:
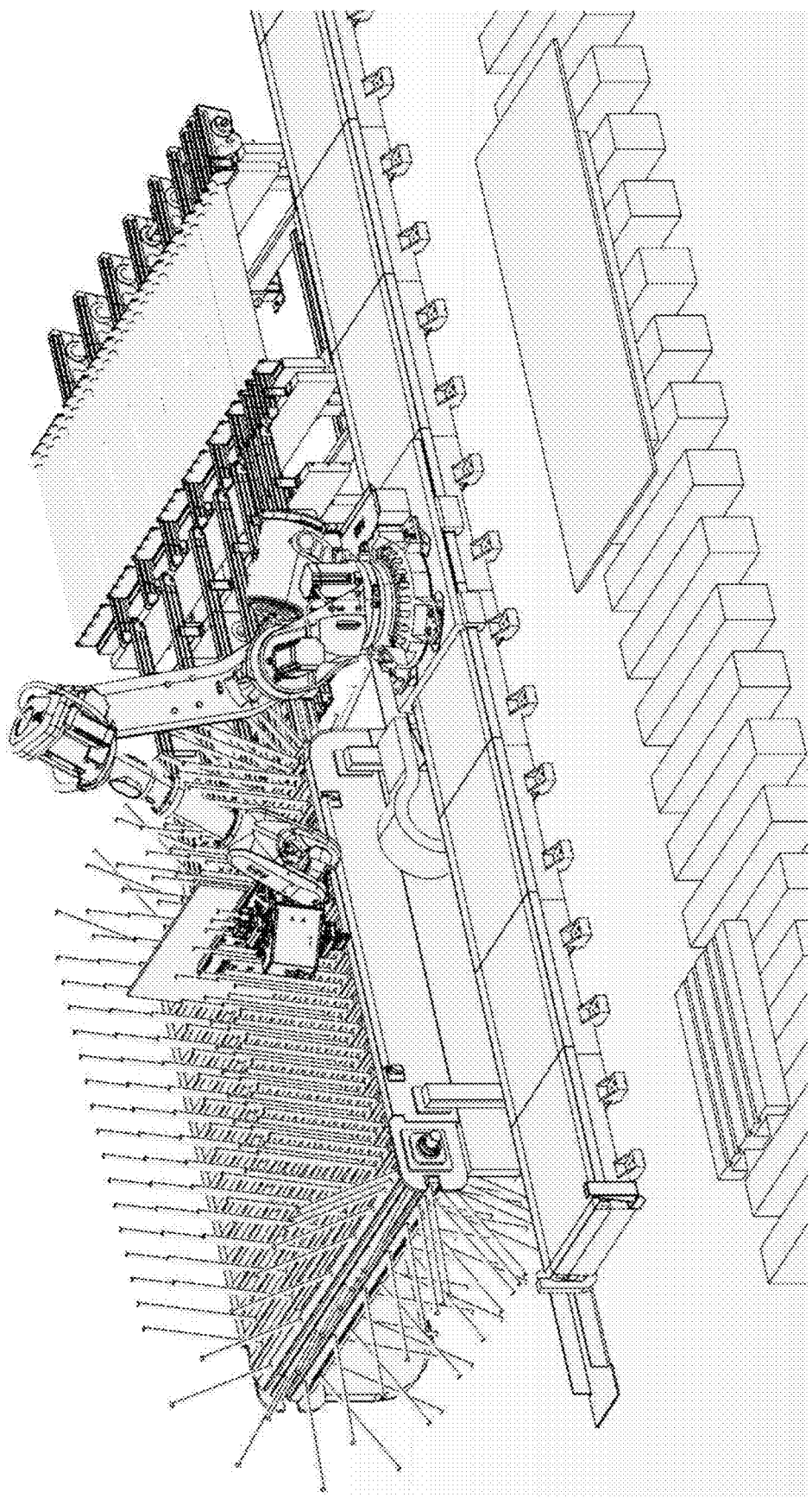
FIG. 10 is a perspective view of the wood-processing system of FIG. 8 illustrating the grasping of a second workpiece in the buffer by the robot.
Figure 11:
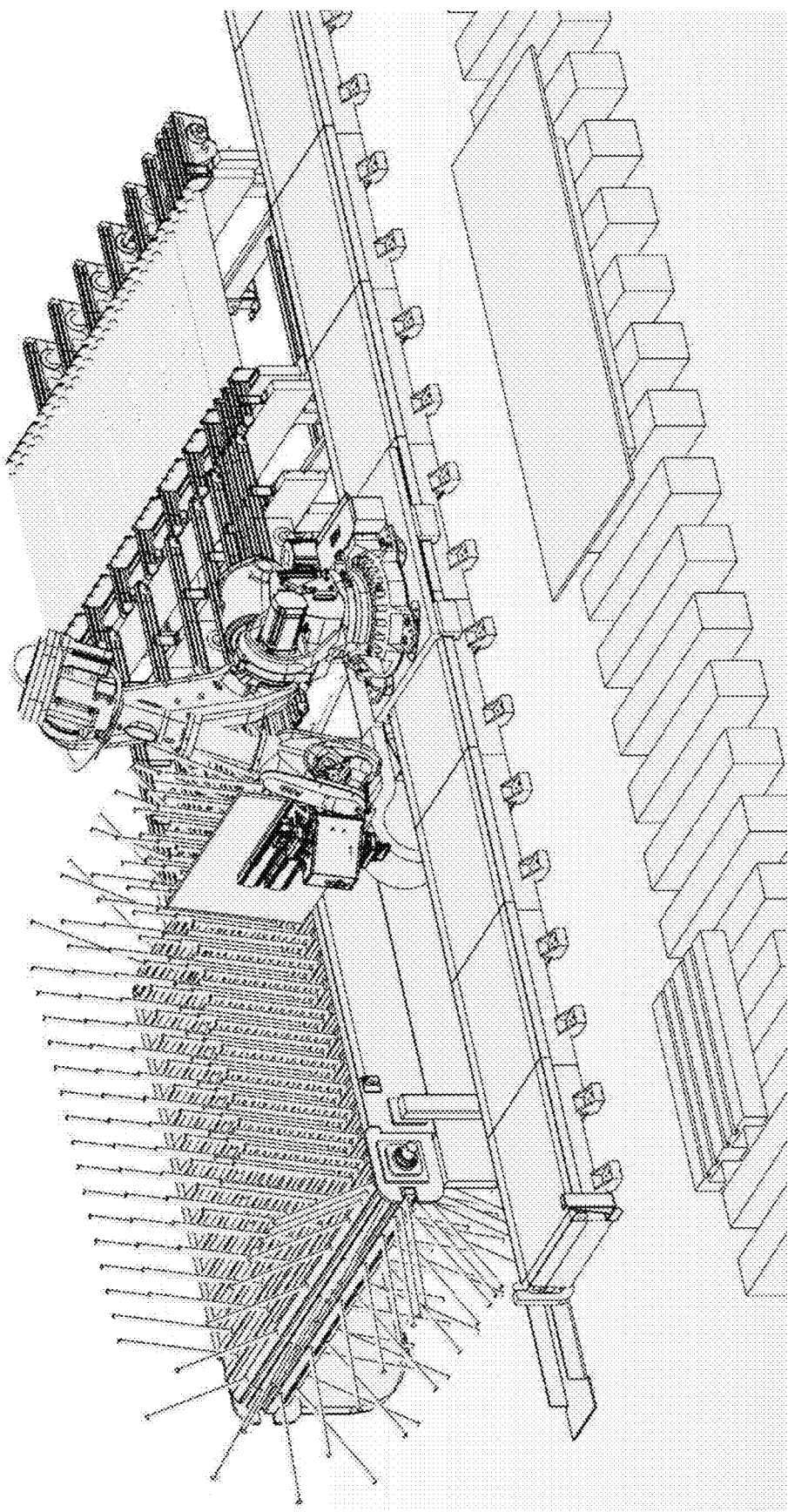
FIG. 11 is a perspective view of the wood-processing system of FIG. 8 illustrating the removal of the second workpiece from the buffer by the robot.
Figure 12:
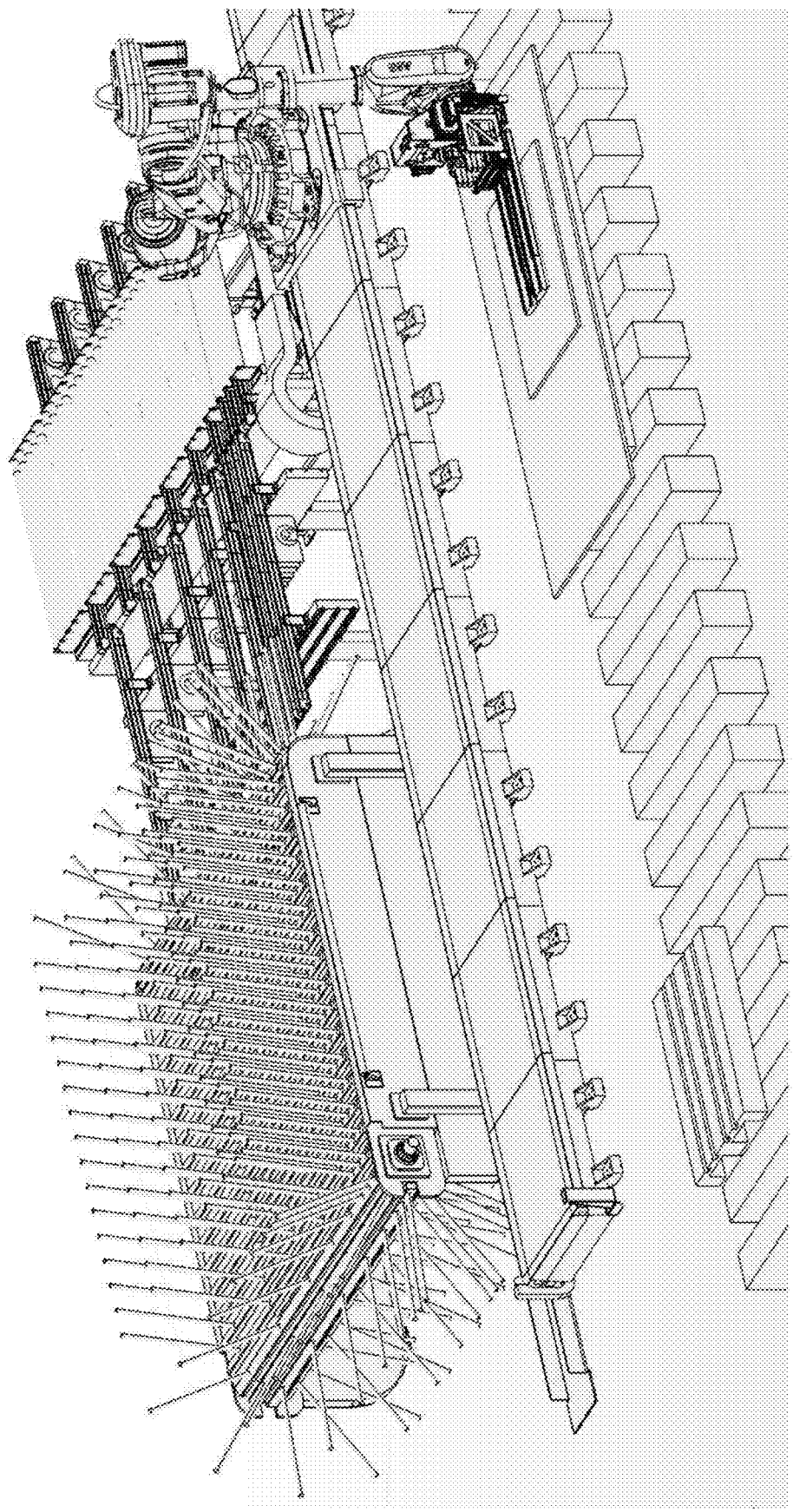
FIG. 12 is a perspective view of the wood-processing system of FIG. 8 illustrating the placement of the second workpiece onto the first workpiece on the depositing device by the robot.

Referring to FIGS. 6-12, an exemplary embodiment of the removal of workpieces 7 from the buffer 1 to the depositing device 4 is illustrated. FIG. 6 is a schematic top view of the wood-processing system illustrating the removal of workpiece 7 from buffer 1. FIG. 7 is a schematic top view illustrating the placement of workpiece 7 onto depositing device 4. FIG. 8 is a perspective view illustrating the removal of first workpiece 7A from buffer 1 by robot 2. FIG. 9 is a perspective view illustrating the placement of first workpiece 7A onto depositing device 4 by robot 2. FIG. 10 is a perspective view illustrating the grasping of second workpiece 7B in buffer 1 by robot 2. FIG. 11 is a perspective view illustrating the removal of second workpiece 7B from buffer 1 by robot 2. FIG. 12 is a perspective view illustrating the placement of second workpiece 7B onto first workpiece 7A on depositing device 4 by robot 2.

As shown in FIGS. 6-7, buffered workpieces 7 are removed from buffer 1 by robot 2 in accordance with control criteria and are deposited in a predetermined deposit position in depositing device 4, which is separate from buffer 1, or in another deposit position in buffer 1 itself. Robot 2 is configured to remove workpieces 7 from buffer 1 and to deposit workpieces 7 on deposit means 41 to 44 of depositing device 4 and/or at another deposit point in buffer 1, by a wood-processing method in which workpieces 7 are guided and/or processed in a wood-processing system, wherein workpieces 7 are fed to buffer 1 and are buffered therein, and then are removed to depositing device 4.

In a preferred embodiment, workpieces 7 remain in motion throughout the system and method, moving continuously along conveying device 11 to buffer 1, being continuously removed from conveying device 11 by buffer 1, continuously moving along buffer 1, being continuously removed from buffer 1 by robot 2, and being continuously deposited on depositing device 4 by robot 2. The control criteria can be implemented by computers and other digital devices to synchronize and coordinate the various movements of components 1, 2, 4, 11 of the invention. The speed of the movements of the various components can be increased or decreased as necessary or desired, individually but preferably jointly, or stopped altogether. To assist in accomplishing this, robot 2 can be movable relative to either or both buffer 1 and depositing device 4, whereby robot 2 is movable relative to buffer 1, which is moving, so as to grasp and remove a respective one of the workpieces 7 from buffer 1, and whereby robot 2 is movable relative to depositing device 4 so as to deposit the respective one of the workpieces 7 onto depositing device 4.

FIG. 6 illustrates workpieces 7 being moved by buffer 1 in the direction of arrow V1. Robot 2 is illustrated in a position for gripping workpiece 7 (workpiece 7 labeled 1) for subsequent movement to depositing device 4. Robot 2 can move along rails 15 in a back-and-forth direction so as to maintain position relative to the workpiece 7 being removed from buffer 1. FIG. 7 illustrates workpiece 7 being deposited onto deposit means 41 of depositing device 4. This process can be repeated for each workpiece 7 located in buffer 1, with workpiece 7 being deposited on any one of depositing means 41 to 44.

The use of at least one robot 2 provides a whole range of advantages. First of all, workpieces 7 removed from buffer 1 can be deposited in an accurate position in a significantly shorter time than is possible manually. It is also possible to re-sort workpieces 7 in buffer 1, even if buffer 1 is designed to be movable, for example. By means of robot 2, workpieces 7 can be removed from buffer 1 at any time and fed to quality assurance or picking, for example. Workpieces 7 can also be returned to buffer 1. In addition, the use of robot 2 provides greater flexibility in terms of the design of buffer 1 and the orientation of workpieces 7 in buffer 1 and/or on deposit means 4. By using robot 2, unlike for simple discharge, workpieces 7 can be oriented in any manner on deposit means 4, for example horizontally, vertically, or obliquely. Likewise, workpieces 7 can be oriented in any manner in buffer 7, as robot 2 is capable of cooperating both with a moving and an idle buffer 1 and of removing workpieces 7 from buffer 1 or inserting workpieces 7 into buffer 1.

As shown in FIGS. 8-12, the system and method of the present invention can be seen as a continuous process. Buffer 1 is preferably supplied from an ongoing process. For this purpose, the wood-processing system may for example comprise a processing center and/or a processing circuit and/or a sawing device and/or a through-feed processing machine, from which workpieces 7 enter buffer 1. For this purpose, the invention may comprise a feed device, such as conveying device 11, that feeds workpieces 7 to buffer 1. The feed may be sequential, but a plurality of workpieces 7 may also be fed to buffer 1 simultaneously. In addition, different deposit means 41 to 44 also may be provided in depositing device 4 depending on the intended application. In particular, depositing device 4 may comprise stationary deposit means 41 to 44, in particular pallets and/or a shelf and/or movable deposit means, in particular belt conveyors and/or roller conveyors and/or brush carriages.

FIG. 8 illustrates the removal of first workpiece 7A from buffer 1 by robot 2. Workpieces 7A, 7B were previously loaded into buffer 1 via conveying device 11. First workpiece 7A is shown as a larger workpiece 7 compared to second workpiece 7B, which is shown located in front of first workpiece 7A. Fingers 12 separate first workpiece 7A from second workpiece 7B on buffer 1. Robot 2 is in the process of grasping first workpiece 7A for removal from buffer 1. Robot 2 is illustrated at a first location on rails 15, and can move along rails 15 in the event that buffer 1 is in motion or for moving to grasp a certain workpiece 7 at a certain location in buffer 1. For example, when buffer 1 is in motion, workpieces 7A, 7B are also in motion, that is, fingers 12 are moving workpieces 7 along buffer 1 from right to left in this figure.

FIG. 9 illustrates the placement of first workpiece 7A onto depositing device 4 by robot 2. More specifically, first workpiece is being placed on a selected depositing mean 42, in this illustration, a pallet. Between the position of first workpiece 7A in buffer 1 in FIG. 8 and the position of first workpiece 7A on deposit means 42 in FIG. 9, robot 2 has slid or lifted first workpiece 7A off of buffer 1 and has rotated towards depositing device 4 so as to be able to deposit first workpiece 7A on deposit means 42. Robot 2 is illustrated at a second location on rails 15. More specifically, robot 2 has moved along rails so as to be able to deposit first workpiece 7A at the location of deposit means 42.

FIG. 10 illustrates the grasping of second workpiece 7B in buffer 1 by robot 2. After placing first workpiece 7A on deposit means 42, robot 2 has rotated back towards buffer 1 so as to be able to remove second workpiece 7B. Robot 2 also has moved to a third location on rails 15 so as to be in a proper position for grasping second workpiece 7B.

FIG. 11 illustrates the removal of second workpiece 7B from buffer 1 by robot 2. In this figure, second workpiece 7B is illustrated as being slid out of buffer 1.

FIG. 12 illustrates the placement of second workpiece 7B onto first workpiece 7A on depositing device 4 by robot 2. Placed on top of the first workpiece 7A on depositing means 42. Between the position of second workpiece 7B in buffer 1 in FIGS. 10 and 11 and the position of second workpiece 7B on deposit means 42 in FIG. 12, robot 2 has slid second workpiece 7A out of buffer 1 and has rotated towards depositing device 4 so as to be able to deposit second workpiece 7B on deposit means 42. Robot 2 is illustrated at a fourth location on rails 15. More specifically, robot 2 has moved along rails so as to be able to deposit second workpiece 7B at a specific point on top of first workpiece 7A.

Although in the process as illustrated in FIGS. 8-12, the system is not necessarily in motion, the process can be in constant motion, with workpieces 7 being loaded into buffer 1 from conveying device 11, workpieces 7 being moved along buffer 1, workpieces being grasped by robot 2 and removed from buffer 1, and workpieces 7 being deposited on depositing device 4. A person of ordinary skill in the art can program an appropriate digital device with the desired control criteria for operating the system of the invention in a continuous and synchronized manner.

The radius and range of action of robot 2 can be enlarged by robot 2 itself being movable at least along one axis. As shown in the figures, this is accomplished by providing that robot 2 can be moved linearly, in particular in parallel with depositing device 4, at least in a first direction, in particular on rails 15, in order to travel to deposit means 4 arranged in succession in the first direction. In this way, the flexibility of the wood-processing system according to the invention is significantly increased. A second robot (not shown) can also be provided which preferably is likewise movable along the same axis as robot 2. This can increase the cycle times, with the two robots also being able to perform different tasks.

According to another embodiment of the present invention, it may be provided that workpieces 7 can be moved in buffer 1. In this embodiment, robot 2 can grasp workpiece 7 from a first location in buffer 7 in the same manner as taught above, remove workpiece 7 from the first location in buffer 1, and move workpiece 7 to a second location in buffer 1. Moving workpieces 7 within buffer 1 can be advantageous when, for example, the process is in continuous motion, workpiece 7 is moving to the end of buffer 1 (for example, on the far left of buffer 1 in FIGS. 8-12), and there is nowhere to place workpiece 7 on depositing device 4. In this case, workpiece 7 can be moved from one end of buffer 1 to another location in buffer 1 to prevent workpiece 7 from falling off of buffer 1 as it reaches the end of buffer 1.

Thus, the wood-processing method according to the invention allows for planar workpieces 7 made of wood or wood-substitute materials to be guided and/or processed in a wood-processing system, wherein workpieces 7 are fed to buffer 1 and buffered therein. The buffered workpieces 7 are further removed from buffer 1 by robot 2 in accordance with control criteria and are deposited in a predetermined deposit position in depositing device 4 that is separate from buffer 1. Alternatively or additionally, workpieces 7 also can be deposited in another deposit position in buffer 1 itself instead of being deposited on the separate depositing device 4. On one hand, therefore, workpieces 7 can be deposited for discharge, picking or quality assurance, and on the other hand it is possible to re-sort the buffer 1, i.e., to change the order of workpieces 7 in buffer 1.

According to a preferred variant, robot 2, after depositing workpiece 7 on deposit means 4, receives a protective material, in particular protective paper, protective cardboard or protective film, from a storage means and then applies it to deposited workpiece 7. For this purpose, the invention may further comprise a storage means (not shown) that can be reached by robot 2 and stores protective material, such as protective paper, protective cardboard or protective film.

It may also preferably be provided that robot 2 is moved linearly along depositing device 4 in a first direction. In this way, it is possible to load deposit means 4 of a moving or stationary depositing device 4 in succession.

The foregoing detailed description of the preferred embodiments and the appended figures have been presented only for illustrative and descriptive purposes. They are not intended to be exhaustive and are not intended to limit the scope and spirit of the invention. The embodiments were selected and described to best explain the principles of the invention and its practical applications. One skilled in the art will recognize that many variations can be made to the invention disclosed in this specification without departing from the scope and spirit of the invention.

What is claimed is:

1. A wood-processing system comprising:
a buffer (1), which receives and buffers planar workpieces (7) made of wood or wood-substitute materials;
a feed apparatus (8), which feeds the workpieces (7) to the buffer (1);
a depositing device (4), on which workpieces (7) removed from the buffer (1) are deposited; and
at least one robot (2), arranged between the buffer (1) and the depositing device (4), which at least one robot (2) is configured to remove the workpieces (7) from the buffer (1) and to deposit the workpieces (7) on a deposit means (41-44) of the depositing device (4),
wherein the buffer (1) is a moving buffer in which the workpieces (7) fed to the buffer (1) are held in motion,
wherein the buffer (1) has a hedgehog-shaped configuration comprising a plurality of fingers (12) arranged in rows that rotate endlessly in a racetrack pattern for buffering and keeping individual workpieces (7) separate from each other in buffer (1).

2. The wood-processing system according to claim 1, wherein the depositing device (4) comprises deposit means (41-44).

3. The wood processing system according to claim 2, wherein the deposit means (41-44) is selected from the group consisting of pallets and shelves.

4. The wood-processing system according to claim 1, wherein the at least one robot (2) is movable linearly, at least in a first direction (X), in order to travel to deposit means (41-44) arranged in succession in the first direction (X).

5. The wood-processing system according to claim 4, wherein the at least one robot (2) is movable linearly in parallel with the depositing device (4).

6. The wood-processing system according to claim 1, wherein the feed apparatus (8) is a conveyor that feeds the workpieces (7) to the buffer (1) sequentially.

7. The wood-processing system according to claim 1, wherein the buffer (1) and the conveying device (11) are synchronized such that the fingers (12) rotate through openings (13) in the conveying device (11) at an appropriate time for removing the workpieces (7) from the conveying device (11) and loading the workpieces (7) onto the buffer (1).

8. The wood-processing system according to claim 7, wherein the at least one robot (2) is movable relative to the buffer (1) and the depositing device (4), whereby the at least one robot (2) is movable relative to the buffer (1), which is moving, so as to grasp and remove a respective one of the workpieces (7) from the buffer (1) and whereby the at least one robot (2) is movable relative to the depositing device (4) so as to deposit the respective one of the workpieces (7) onto the depositing device (4).

9. The wood-processing system according to claim 1, wherein the workpieces (7) remain in motion throughout the system, the workpieces (7) moving continuously along the conveying device (11) to the buffer (1), the workpieces (7) being continuously removed from conveying device (11) by the fingers (13) of the buffer (1), the workpieces (7) continuously moving along the buffer (1), the workpieces (7) being continuously removed from the buffer (1) by the at least one robot (2), and the workpieces (7) being continuously deposited on the depositing device (4) by the at least one robot (2).

10. A wood-processing method in which planar workpieces (7) made of wood or wood-substitute material in a wood-processing system, comprising:
feeding workpieces (7) to a buffer (1) and buffering the workpieces (7) in the buffer (1) using a feed apparatus (8) to feed the workpieces (7) to the buffer (1);
removing buffered workpieces (7) from the buffer (1) by a robot (2) in accordance with control criteria; and
depositing the buffered workpieces (7) in a predetermined deposit position in a depositing device (4) that is separate from the buffer (1) or in another deposit position in the buffer (1) itself,
wherein the buffer (1) is a moving buffer in which the workpieces (7) fed to the buffer (1) are held in motion,
wherein the buffer (1) has a hedgehog-shaped configuration comprising a plurality of fingers (12) arranged in rows that rotate endlessly in a racetrack pattern for buffering and keeping individual workpieces (7) separate from each other in buffer (1).

11. The wood-processing method according to claim 10, in which the robot (2), after depositing a workpiece (7) on a deposit means (41-44), receives a protective material from a storage means and applies it to said workpiece (7).

12. The wood-processing method according to claim 11, wherein the robot (2) is moved linearly along the depositing device (4) in a first direction (X).

13. The wood-processing method according to claim 12, wherein the protective material is selected from the group consisting of protective paper, protective cardboard, and protective film.

14. The wood-processing method according to claim 11, wherein the protective material is selected from the group consisting of protective paper, protective cardboard, and protective film.

15. The wood-processing method according to claim 10, wherein the robot (2) is moved linearly along the depositing device (4) in a first direction (X).

16. The wood-processing method according to claim 10, wherein the buffer (1) and the conveying device (11) are synchronized such that the fingers (12) rotate through openings (13) in the conveying device (11) at an appropriate time for removing the workpieces (7) from the conveying device (11) and loading the workpieces (7) onto the buffer (1).

17. The wood-processing system according to claim 16, wherein the robot (2) is movable relative to the buffer (1) and the depositing device (4), whereby the robot (2) is movable relative to the buffer (1), which is moving, so as to grasp and remove a respective one of the workpieces (7) from the buffer (1) and whereby the robot (2) is movable relative to the depositing device (4) so as to deposit the respective one of the workpieces (7) onto the depositing device (4).

18. The wood-processing method according to claim 10, wherein the workpieces (7) remain in motion throughout the system, the workpieces (7) moving continuously along the conveying device (11) to the buffer (1), the workpieces (7) being continuously removed from conveying device (11) by the fingers (13) of the buffer (1), the workpieces (7) continuously moving along the buffer (1), the workpieces (7) being continuously removed from the buffer (1) by the robot (2), and the workpieces (7) being continuously deposited on the depositing device (4) by the robot (2).

* * * * *